Oct. 29, 1968  K. WYSOCKI ET AL  3,407,964
SORTER FOR NON-MAGNETIC AEROSOL VALVES AND OTHER
CLOSURES HAVING ATTACHED TUBES, ETC.
Filed July 26, 1967  2 Sheets-Sheet 1

INVENTOR
Kazmier Wysocki
Thomas J. Benichasa
BY Raymond N. Matson
their PATENT AGENT Oct. 29, 1968  K. WYSOCKI ET AL  3,407,964
SORTER FOR NON-MAGNETIC AEROSOL VALVES AND OTHER
CLOSURES HAVING ATTACHED TUBES, ETC.
Filed July 26, 1967  2 Sheets-Sheet 2

INVENTOR
Kazmier Wysocki
Thomas J. Benichasa
BY Raymond N. Matson
their PATENT AGENT

United States Patent Office 3,407,964
Patented Oct. 29, 1968

3,407,964
SORTER FOR NON-MAGNETIC AEROSOL VALVES AND OTHER CLOSURES HAVING ATTACHED TUBES, ETC.
Kazmier Wysocki, 293 Hudson St., Hackensack, N.J. 07601, and Thomas J. Benichasa, Hackensack, N.J.; said Benichasa assignor to said Wysocki
Filed July 26, 1967, Ser. No. 651,915
9 Claims. (Cl. 221—167)

ABSTRACT OF THE DISCLOSURE

A sort and orienting device for non-magnetic, elongated aerosol valves and other special closures which have dip tubes, extensions, etc. and are haphazardly arranged in a bin, having an inclined, rotatable disc bottom having circumferentially spaced, recessed pockets to pick up one or more valves and orient them by gravity while elevating them to pick-off rails and a hold-down wheel cooperating therewith to effect efficient discharge of the valves from the sorter device.

---

This application is an improvement on our copending application Ser. No. 563,755, filed July 8, 1966, now Patent No. 3,352,455 and entitled Sorter for Non-Magnetic Aerosol Valves and Other Closures Having Attached Tubes, Etc.

This invention relates generally to sorting apparatus and more particularly to an apparatus for sorting or orienting non-magnetic elongated aerosol valves and other special closures which have dip tubes, extensions, etc. and which are haphazardly arranged in a supply bin, and delivering them in an oriented aligned position to a point of discharge.

Apparatus of this general type is known in the art and one example thereof is illustrated by Benichasa Patent No. 3,054,170, dated Sept. 18, 1962 in which a supply of randomly arranged valve assemblies are individually picked up from a hopper by spaced magnetic means arranged on a rotating disc and delivered in oriented position to a chute which picks them off of the disc and delivers them to a valve closure inserting apparatus. While such apparatus has only achieved an efficiency of 25–40%, it nevertheless has been indispensable to the highly automated packaging industry.

However, such magnetic apparatus cannot handle the newer valve assemblies which are formed of non-magnetic materials such as aluminum, stainless steels, and various of the plastics and accordingly, the main object of our copending application was to provide an improved, highly efficient sorter apparatus which obviated the above and other inadequacies of known apparatus.

This object was achieved by providing a sorter apparatus having a bin bottom comprising a disc having circumferentially spaced, recessed pockets which rotates under a randomly arranged supply of valve assemblies in the bin to successively pick up one or more valves and orient them while elevating them to pick-off rails terminating in a chute for discharge to a point of subsequent use such as a valve inserting apparatus for containers, etc. The device embodied additional means for facilitating the picking-up of the valve assemblies from the disc pockets by the pick-off rails, and their transfer to the chute in the form of a vibrator and air jets, both aiding in orienting the valve assemblies and in avoiding pile-ups thereof. As a result, the main object of our copending application has been achieved in that an efficiency as high as 80% is obtained thereby.

The main object of the present invention is to provide an improved sorter apparatus structure and arrangement which ensures the successful transfer of valve assembly bodies from an elevated pocket position to the pick-off rails and chute to result in a very high percentage and degree of efficiency.

Another important object of the present invention is to provide an apparatus of the type described in which means is provided for ensuring that the valves are properly oriented and positioned on the pick-off rails and discharge chute so that a very high percentage thereof are transferred from the pockets to the discharge rails.

A further object of the present invention is to provide an improved sorter apparatus of the type described in which novel means cooperate with the foremost of the pick-off rails to ensure and stabilize the movement of the valve assembly rearwardly to the other pick-off rail and to the chute.

Other objects and advantages of the invention will become apparent during the course of the following description.

In the drawings one embodiment of the invention is shown. In this showing:

Figure 1:
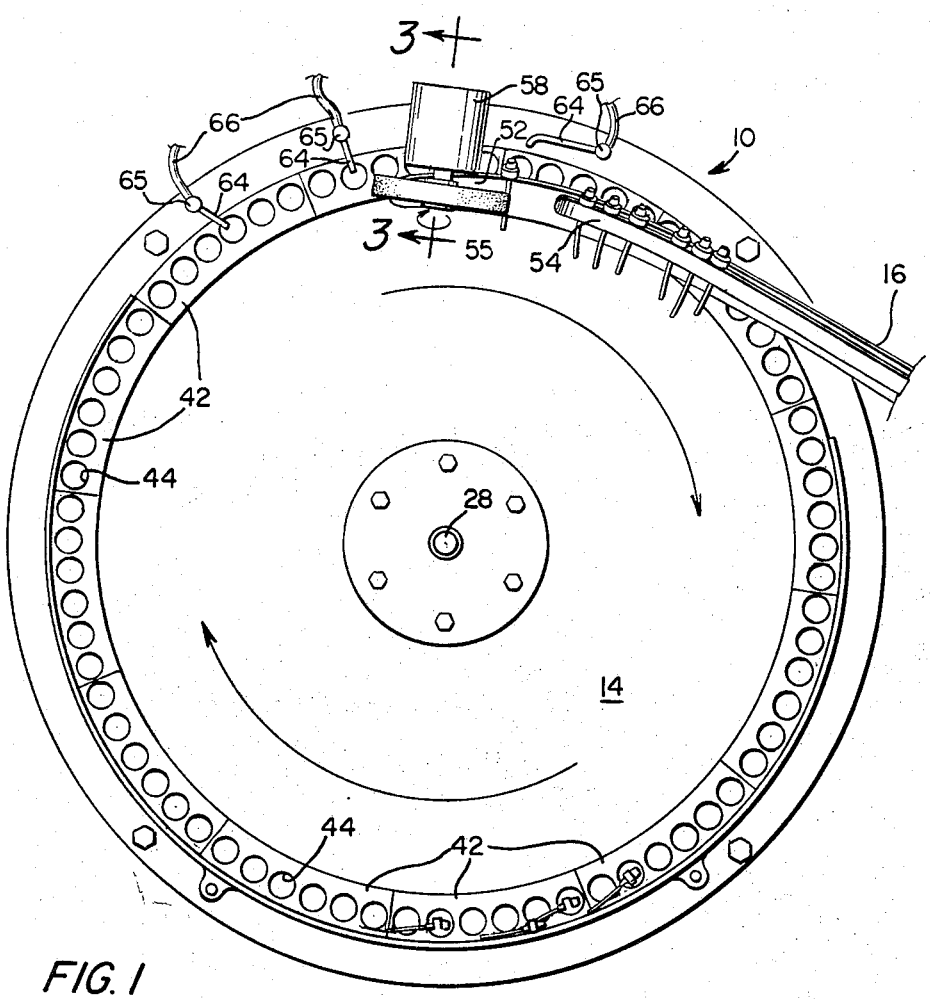
FIGURE 1 is a top plan view of the invention looking along the line 1–2 of FIGURE 2.

Referring now to the drawings, numeral 10 indicates the sorter apparatus as a whole which comprises an inclined hopper 12, a rotatable, valve assembly-elevating disc 14, a pick-off chute 16 and a supporting frame 18.

Figure 2:
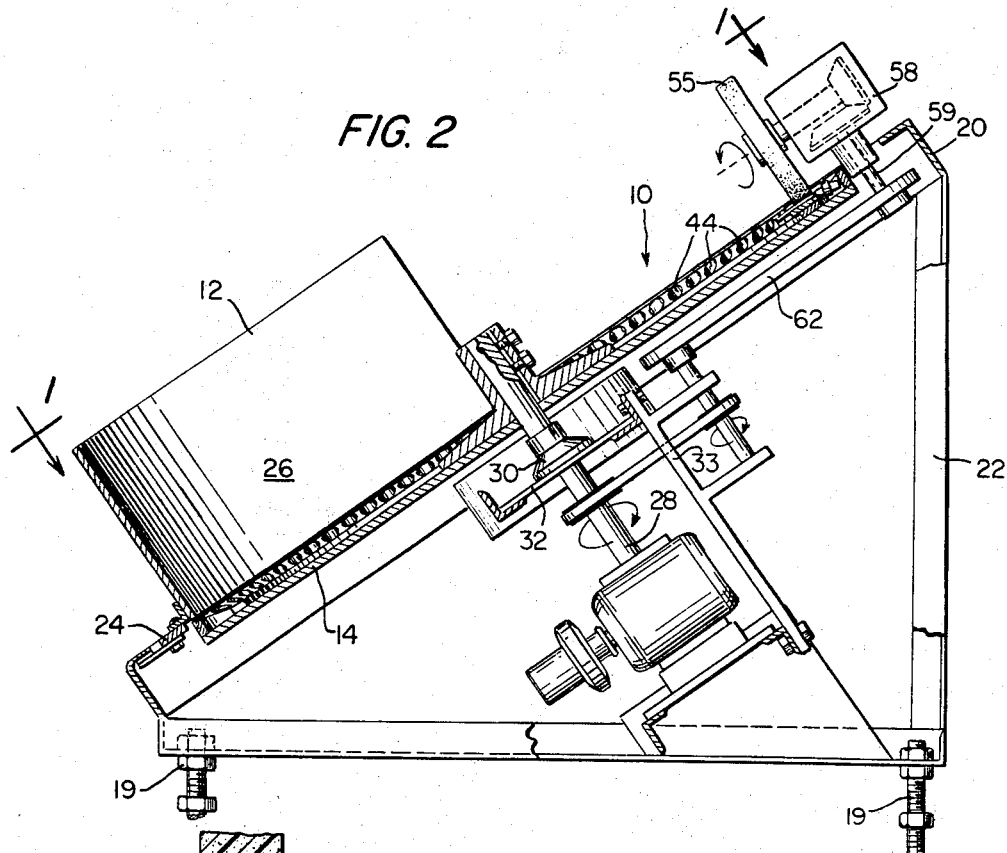
FIGURE 2 is a fragmentary, side elevational view thereof.

As shown in FIGURE 2, a plurality of legs 19 support the frame 18 upon which an inclined rectangular frame 20 is supported at an angle of approximately 45° by spaced straps 22, the inclined frame 20 in turn suitably supporting a parallelly disposed ring 24. The hopper 12 includes an arcuate wall 26 open at its upper side which is suitably secured to the ring 24 so that their lower edges are coplanar.

The disc 14 is of slightly less diameter than and concentrically and coplanarly mounted within the ring 24 on a shaft 28 which is suitably mounted in bearing 30 fixed to a bar 32 supported by a frame member 22. Rotation of the disc 14 is effected by a variable speed, frame mounted motor M through the shaft 28 by suitable gearing (hidden by the motor).

The valve assembly-elevating disc 14 is preferably formed of aluminum with an upstanding peripheral flange 40 within and to which a facing layer of composition material such as S.S. $\frac{1}{32}$" thick or Masonite (depending upon the material used for the valve bodies) which will not mar or scuff valve assemblies, may be fixed. As shown in FIGURES 1 and 2, a plurality of circumferentially spaced, circular pockets 44 are formed in each of a plurality of arcuate, abutting, cast aluminum segmented pieces 42 arranged on the disc 14 against the flange 40, and have a contoured or step-beveled profile for more efficient pick-up of the valve assemblies. It will be noted (FIGURES 1 and 2) that the disc 14 functions as a part of the bottom of the hopper 12 so that upon rotation of the disc 14 by the motor M in the direction of the arrows, the bodies of the valve assemblies contained in the hopper will drop by gravity into the pockets 44 as they pass successively under the supply in the hopper.

Figure 3:
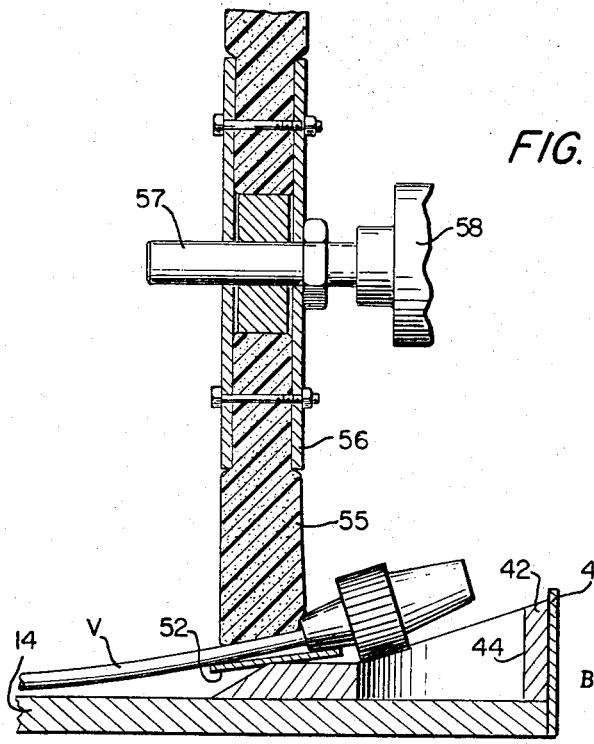
FIGURE 3 is an enlarged, fragmentary, vertical sectional view thereof taken on the line 3—3 of FIGURE 1 and illustrating the action of the novel wheel which cooperates with the pick-off rails.

The pick-off chute 16 which is supported by a bracket on the ring 24 extends generally tangentially from a point closely adjacent the highest point of travel of the pockets 44, downwardly at an angle of about 15 degrees, and outwardly to a point of discharge, which may be the source of supply for valve inserting apparatus, etc. The chute 16 (FIGURES 1 and 3) comprises a pair of closely and laterally spaced, parallel rails 52, 54 upon which the valve bodies slide by gravity in aligned, oriented position with their dip tubes or extensions depending between the rails as shown. The upper end of the rail 54 terminates at a point spaced from the disc 14 while the upper end of the rail 52 curves substantially into the plane of the disc and is closely spaced therefrom so as to intercept the extensions of the valve assemblies V so that they will be removed from the disc pockets 44 and be conducted down the upper edges of the valve body supporting rails 52, 54 by gravity.

The valve assemblies V are quite often moving and bouncing around as they reach the removal point where they are engaged by the rail 52 so as to result in a tendency to fall off of the rail before they reach the start of rail 54 or to bunch up there. A very important feature of the invention resides in the provision of novel means at the valve assembly removal point which stabilizes and controls them, completes their orientation if necessary, and imparts to them a sliding movement along the pick-up rail 52 and ensures their insertion in the chute 16 on the inner side of the rail 54.

In the present disclosure, this novel means takes the form of a soft sponge rubber or polyurethane foam, etc., wheel 55 having a hub 56 by which it is fixed to a shaft 57 rotatably mounted in a right angle gear box housing 58 extending from which is a shaft 59 driven by the motor M through suitable belts and pulleys 60, stub shaft 61 and pulleys and drive belt 62. As shown in FIGURE 1 and particularly in FIGURE 3, the resilient stabilizing wheel 55 is not used to brush away excess valve assemblies but rather, has an ironing type of action which literally fulfills three functions. The wheel helps to orient the parts against the pick-up rail 52 for passage between both rails of the discharge chute, helps to control and stabilize the valve assemblies V as they are removed from the pockets 44, and imparts a sliding motion to them along the pick-off rail 52 and under the pick-off or chute rail 54. If the chute is full, the spacing of the rail 54 from the wheel 55 permits the rejection of the advancing, properly balanced (on rail 52) valve bodies.

Despite the high feed rate of the valve assemblies V to the pick-off chute 16 by the disc pockets 44 (200–300 per minute) at a relatively low disc rotational speed of 8–12 r.p.m., the effective action of the resilient wheel 55 as described eliminates the need to vibrate the chute and hence a vibrator and also a deflector such as are disclosed in our copending application, is dispensed with. However, air jets 64 formed of bendable tubing, mounted in fixtures 65 on the ring 24 and connected to a suitable source of air pressure (not shown) by a conduit 66 has been found to be helpful in orienting the valve assemblies V is directed against the valve bodies just before and upon arrival at the resilient wheel 55 as shown.

The operation of the improved sorting device comprising the present invention is believed to be apparent. Elongated valve assemblies or closures V of various sizes and types are continuously fed by suitably controlled apparatus (not shown) to the hopper 12 so as to maintain an adequate, randomly arranged supply therein as the disc 14 is rotated by the motor M. As the disc 14 rotates under the supply, the bodies of the valve assemblies drop into and are moved by the pockets 44 which then elevate them to the pick-off rail 52 of the chute 16. As explained, the valve assemblies are self oriented by gravity due to the weight of their dip tubes or extensions which action is somewhat enhanced by the natural and indirect vibration imparted by operation of the apparatus. The bottom of the resilient rubber, etc., wheel 55 which engages the valve assemblies as they are removed from the pockets 44 by the pick-off rail 52, is turning at the same speed and in the same direction as the disc so that the tri-functional ironing action is effected and the valve assemblies are moved smoothly and continuously down the discharge chute 16.

The term valve assemblies is intended to mean elongated valve bodies, bodies with dip tubes, and to include any other components having similar shapes or proportions.

It is to be understood that the form of the invention herewith shown and described is to be taken as a preferred example of the same and that various changes in the shape, size and arrangement of parts may be resorted to without departure from the spirit of the invention or the scope of the subjoined claims.

We claim:
1. In a sorting device for receiving randomly arranged bodies having extensions and delivering them to a discharge point in oriented, aligned position comprising a rotatable disc having circumferentially spaced pockets for reception of the bodies with the extensions depending therefrom to orient the bodies by gravity due to their weight during rotation of the disc, and an inclined discharge chute including a pair of closely spaced body supporting rails the upper end of one of which terminates closely adjacent to the surface of said disc to engage the extensions and dislodge the bodies from the pockets onto the discharge chute; a resilient wheel mounted adjacent said one upper end and rotatable with said disc to engage the dislodged extensions and bodies and move them along said one upper end and onto both of said rails of said inclined chute for discharge by gravity therefrom.

2. The invention recited in claim 1 wherein said wheel is formed of soft rubber or other resilient plastic or composition material.

3. A sorter for delivering oriented and aligned valve bodies having dip tubes from a bin containing a randomly arranged mass thereof to a discharge point comprising, in combination, a disc rotatable about an inclined axis and forming a part of the bottom of the bin; a plurality of circumferentially spaced, valve body receiving pockets formed in the surface of said disc and being of greater diameter than the body of the valves; a pick-off chute positioned adjacent said disc to engage the depending dip tubes of valve bodies received in said pockets when elevated by rotation of said disc, and inclining downwardly to remove the valve bodies from the disc and convey them by gravity to the discharge point; means for rotating said disc to effect gravity deposit of the valve bodies into the pockets from the bin and depending of the dip tubes from their bodies in the pockets to orient them during rotary elevating movement of the pockets to said pick-off chute, and means positioned adjacent the upper end of said pick-off chute to ensure the transfer of all of said valve bodies to said discharge chute.

4. The combination recited in claim 3, and additional means positioned adjacent said ensuring means to assist the orientation of the valve bodies transferred to said discharge chute.

5. The combination recited in claim 4 wherein said additional means comprises at least one air jet.

6. The combination recited in claim 3 wherein said ensuring means comprises a resilient wheel rotatable with said disc and engaging said dip tubes to hold them on said chute.

7. The combination recited in claim 6 wherein said resilient wheel is formed of soft rubber or other resilient plastic or composition material.

8. The combination recited in claim 6, and additional means positioned adjacent said ensuring means to assist the orientation of the valve bodies transferred to said discharge chute.

9. The combination recited in claim 8 wherein said additional means comprises at least one air jet.

References Cited

UNITED STATES PATENTS 2,176,659  10/1939  Mundy _____ 221—162
2,998,119  8/1961  Winberg _____ 221—182 X STANLEY H. TOLLBERG, *Primary Examiner.*